Dec. 23, 1952 R. H. DREISBACH ET AL 2,623,127

HUM BUCKING CIRCUIT

Filed Feb. 1, 1950 3 Sheets-Sheet 1

INVENTORS:
Robert H. Dreisbach
Clifford L. Hardwick
By: Clarence J. Loftus
Attorney Dec. 23, 1952 R. H. DREISBACH ET AL 2,623,127

HUM BUCKING CIRCUIT

Filed Feb. 1, 1950 3 Sheets-Sheet 2

INVENTORS:
Robert H. Dreisbach
Clifford L. Hardwick
By: Clarence J. Loftus
Attorney.

HUM BUCKING CIRCUIT

INVENTORS:
Robert H. Dreisbach
Clifford L. Hardwick
By: Clarence J. Loftus
Attorney.

Patented Dec. 23, 1952 2,623,127

UNITED STATES PATENT OFFICE 2,623,127

HUM BUCKING CIRCUIT

Robert H. Dreisbach and Clifford L. Hardwick, Fort Wayne, Ind., assignors to The Magnavox Company, Fort Wayne, Ind., a corporation of Delaware Application February 1, 1950, Serial No. 141,752

11 Claims. (Cl. 179—115.5)

This invention relates to transducing apparatus and more particularly to hum bucking circuits for use therein where hum bucking is advantageous or necessary to suppress or eliminate hum resulting from unwanted alternating currents as occurs, for example, in dynamic loudspeakers, magnetic phonograph pickups, shorted turn testers and the like.

The invention will be first described by way of example in connection with a dynamic loudspeaker, and secondly, by way of example in connection with a shorted turn tester.

The direct current field excitation in the field coil of a dynamic loudspeaker is usually obtained from a power source which not only provides the desired direct current, but also superimposes thereon a certain alternating current (ripple current). This is due to the fact that common filters used in such sources to obtain the direct current are not completely able to filter the alternating current in such a way that only a direct current without a ripple current is obtained. This is especially true in the case of radio receivers and like apparatus in which the field coil (used to produce the necessary magnetic field) of the dynamic loudspeaker is used as the filter choke of said source.

Accordingly, an undesired voltage is induced into the moving coil of the dynamic loudspeaker, which results in an undesired alternating current when the moving coil is terminated by an impedance of a second source supplying the desired alternating current to the moving coil in order to reproduce the desired sound. The undesired alternating current causes objectionable hum.

Many attempts have been made in the past to eliminate this hum, but they have only been partially effective and far from satisfactory. These methods have used individually and in combination hum bucking coils, copper rings and steel rings. A hum bucking coil is a special coil connected in series opposition with the moving coil. It is usually placed around the centerpole of the field structure, either at the rear end of the field coil, or under it, or at the front end of it.

Also, copper rings have been used at the front end of the field coil next to the moving coil, but if these copper rings are large enough to serve as an effective shorted turn to substantially reduce the undesired alternating current flux through the moving coil (periodical alteration of the magnetic field caused by the before mentioned undesired alternating current in the field coil) they have the disadvantage of also reducing the inductance of the field coil to such an extent that the field coil can no longer serve as an effective filter choke if the field coil is used as a choke in radio receivers and like apparatus.

Steel rings also have a shorted turn effect, but increase leakage in the field, especially when used at the front end of said coil; there is accordingly a considerable reduction of the useful field through the moving coil resulting in less efficiency of the loudspeaker.

Also, copper or steel rings in combination with bucking coils have been used, the desired combination being only found by a lengthy and costly trial and error method.

None of these arrangements has proved to be really successful, the degree of success depending upon the design of the particular field structure involved and many field structures responding very poorly to the above treatment.

If the turns of a bucking coil were adjusted so that the same hum voltage appeared across it as appears across a moving coil associated with it, it is to be expected that when the two coils are connected in series opposition, no hum voltage would appear across the combination and hence, no undesired hum current would flow if the combination was connected to an impedance of the source supplying the desired alternating current, thereby forming a closed circuit.

However, in practice, it has not been found possible to buck the two mentioned hum voltages in the bucking coil and the moving coil to a satisfactory minimum and it has been generally recognized that this is due to a phase difference between the two voltages and a wave shape difference.

It is an object of the present invention to overcome the above difficulties and disadvantages and provide means which will prevent the flow of hum current through the moving coil.

To this end by this invention it has been determined that the difference in wave shape between the two voltages is of minor importance as the two wave shapes do not differ too much, and that the problem is principally one of correcting the phase of the voltage induced in the bucking coil by said flux.

Whereas others have unsuccessfully attempted to correct this condition by changing the flux through the bucking coil, as hereinbefore explained, according to the present invention the problem is approached by shifting the phase of the hum voltage after it is induced in the bucking coil and then bucking this phase corrected hum voltage against the hum voltage of the moving coil, thereby eliminating flow of hum current through the moving coil. The bucking coil can then be located in the field structure where it is most convenient. A necessity is that the bucking coil circuit connected in series with the moving coil must be of low impedance with respect to the moving coil, otherwise too much of the signal power of the source supplying the desired alternating current will be dissipated, resulting in loss and reducing the efficiency of the loudspeaker.

In order to shift the phase of the hum voltage of the bucking coil there is provided an impedance across the bucking coil thereby forming a closed circuit in which will flow a hum current, the closed circuit including at least one reactance element. This current develops a hum voltage across one of the elements of this circuit, which is equal in phase and magnitude to the hum voltage induced in the moving coil with which it is connected in phase opposition. Thus there is no hum voltage appearing across the combination of the moving coil and the bucking coil circuit and therefore no hum current will flow through the moving coil when this combination is connected to the impedance of the source supplying the useful moving coil current.

It is possible to obtain the desired result by using as an impedance a capacitor across the bucking coil as this circuit will shift the phase, but the impedance of the usual bucking coil in a dynamic loudspeaker is so low that the capacitor has to have a value of several hundred microfarads. This is impractical because of the size of such a capacitor.

It has been found that an inductance in series with the bucking coil feeding a load resistor will give the desired phase shift to the voltage appearing across the resistor resulting in no flow of hum current through the moving coil. It is obvious that the additional inductance required may be built into the bucking coil itself by using additional turns (thereby increasing the inductance) so that it is necessary to add only a resistor. This is a preferred form of the invention.

The advantages of this invention will be more clearly understood from the accompanying drawings embodying the invention in which.

Figures 8*a*, 8*b*, 8*c*, 8*d*, 8*e*, 8*f*, 8*g*, 8*h*, 8*i*, 8*j* and 8*k* showing some of the possible hum bucking coil circuits embodying the invention.

Figure 9:
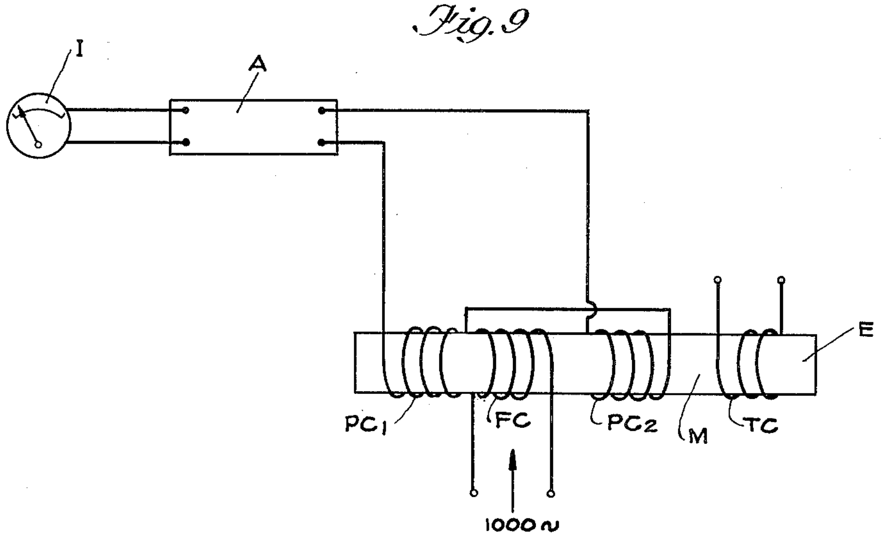

Figure 9 shows a typical shorted turn tester not embodying the invention.

Figure 10:
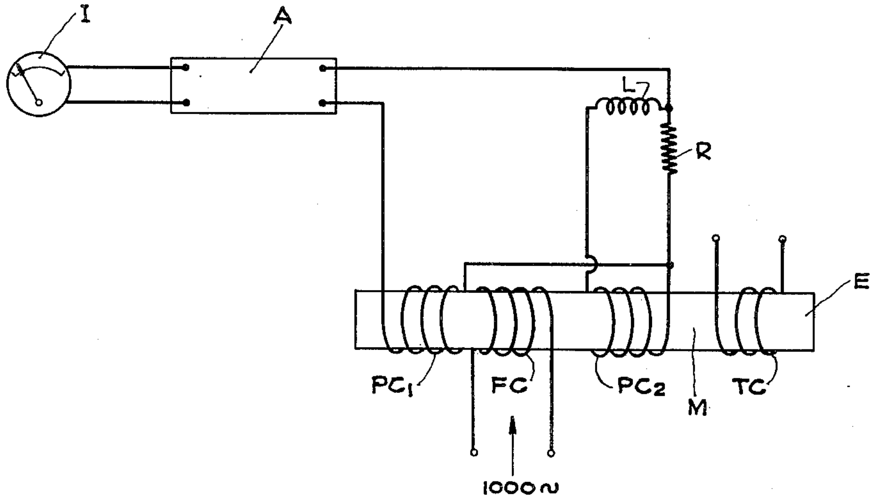

Figure 10 shows a shorted turn tester embodying the invention.

Figure 1:
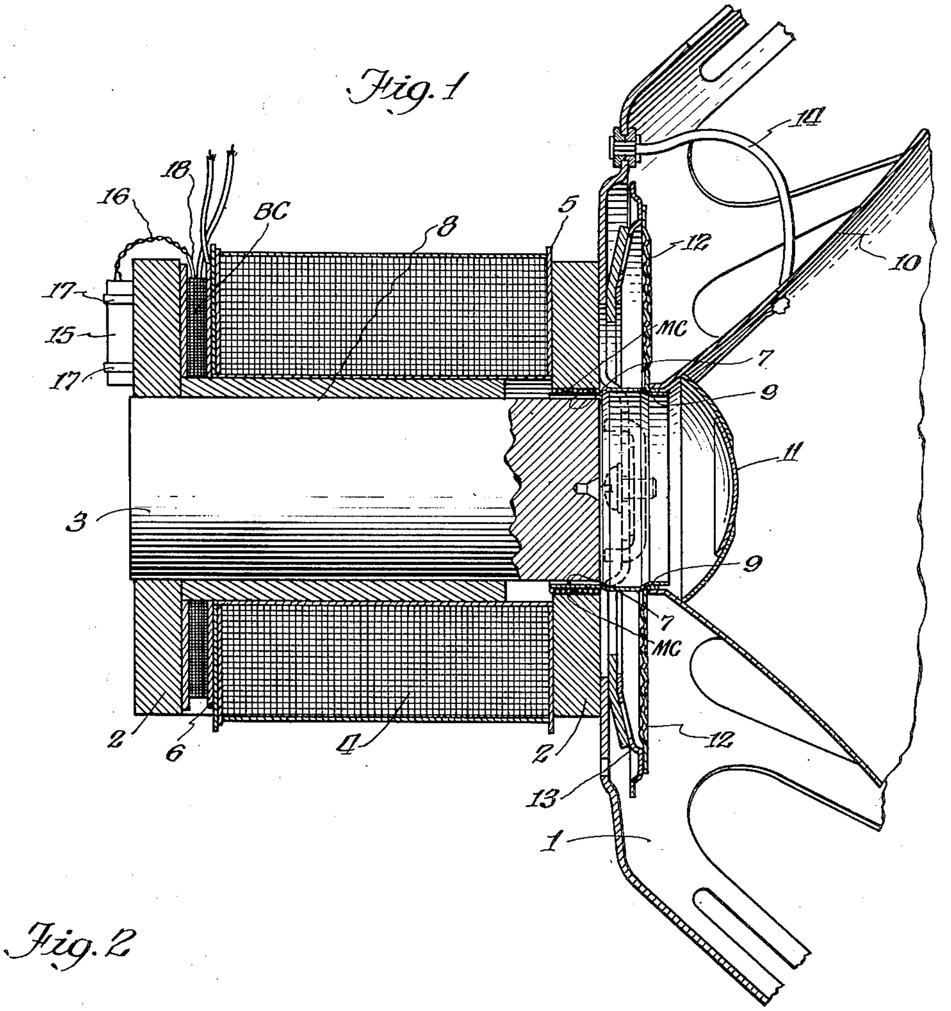
Figure 1 is a longitudinal sectional view of a dynamic loudspeaker embodying the invention.

Figure 1 shows a dynamic loudspeaker comprising a frame 1, a field coil body structure 2, of U-shape in longitudinal section and preferably of circular cross section. Centrally disposed within the field coil body structure 2, and securely fixed thereto, is a cylindrical bar of magnetizable material 3, this bar extending forwardly through the central opening 8, in the field coil body structure. Within the field coil body 2 is located the field coil 4, its turns lying in a plane perpendicular to the longitudinal axis of the bar 3, said field coil being insulated from the field coil body structure 2, by an insulating layer 5. Between the field coil 4 and the rear end portion of the field coil body structure is provided a space 18 for a hum bucking coil BC insulated from the field coil body structure 2 and field coil 4 by means of an insulating layer 6. An annular air space 7 is provided between the iron bar 3 and the front end portion of the field coil body structure 2, to provide space for a moving coil MC, on a body 9, which body is preferably of cylindrical shape. The turns of the moving coil MC are located in a plane parallel to the plane of the turns of the field coil 4. Attached to the body 9 is a cone 10, which serves to reproduce the sound in the well-known manner. A shield 11 attached to the cone 10 is provided to protect the air space 7 from dust and dirt as is usual. Elastic means 12 are provided for centering the moving coil body 9, one end thereof being attached to the frame 1 by means of a support 13, and the opposite end to the body 9. Wires 14 are provided for connecting the moving coil MC to the source supplying the desired alternating current to the moving coil MC in order to obtain sound reproduction in the usual manner. A resistor 15 together with the bucking coil BC and conductors 16 form the hum bucking circuit according to the invention. Suitable means 17 are provided for attaching the resistor 15 to the field structure body 2.

Figure 2:
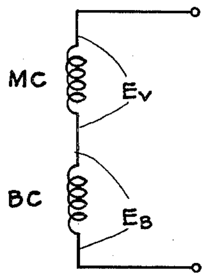
Figure 2 shows the usual hum bucking open circuit.
Figure 3:
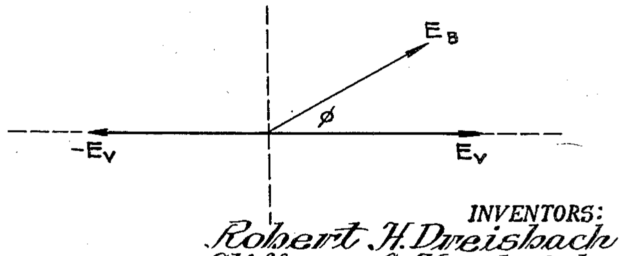
Figure 3 is a vector diagram corresponding to the circuit of Figure 2.

In Figure 2 is shown the usual connection of the bucking coil BC and moving coil MC, that is to say, the two coils are connected in series opposition. In the bucking coil BC is a voltage $E_B$ induced by the alternating hum current in the field coil and induced in the moving coil MC is a voltage $E_V$. The vector diagram of Figure 3 indicates that the voltages $E_B$ and $E_V$ do not have the proper desired phase difference, $E_V$ being the moving coil voltage lagging the bucking coil voltage $E_B$ by an angle $\phi$, and $-E_V$ being a vector representation of the relation when $E_V$ and $E_B$ are considered in phase opposition.

Figures 4, 5, 6, 7, 8:
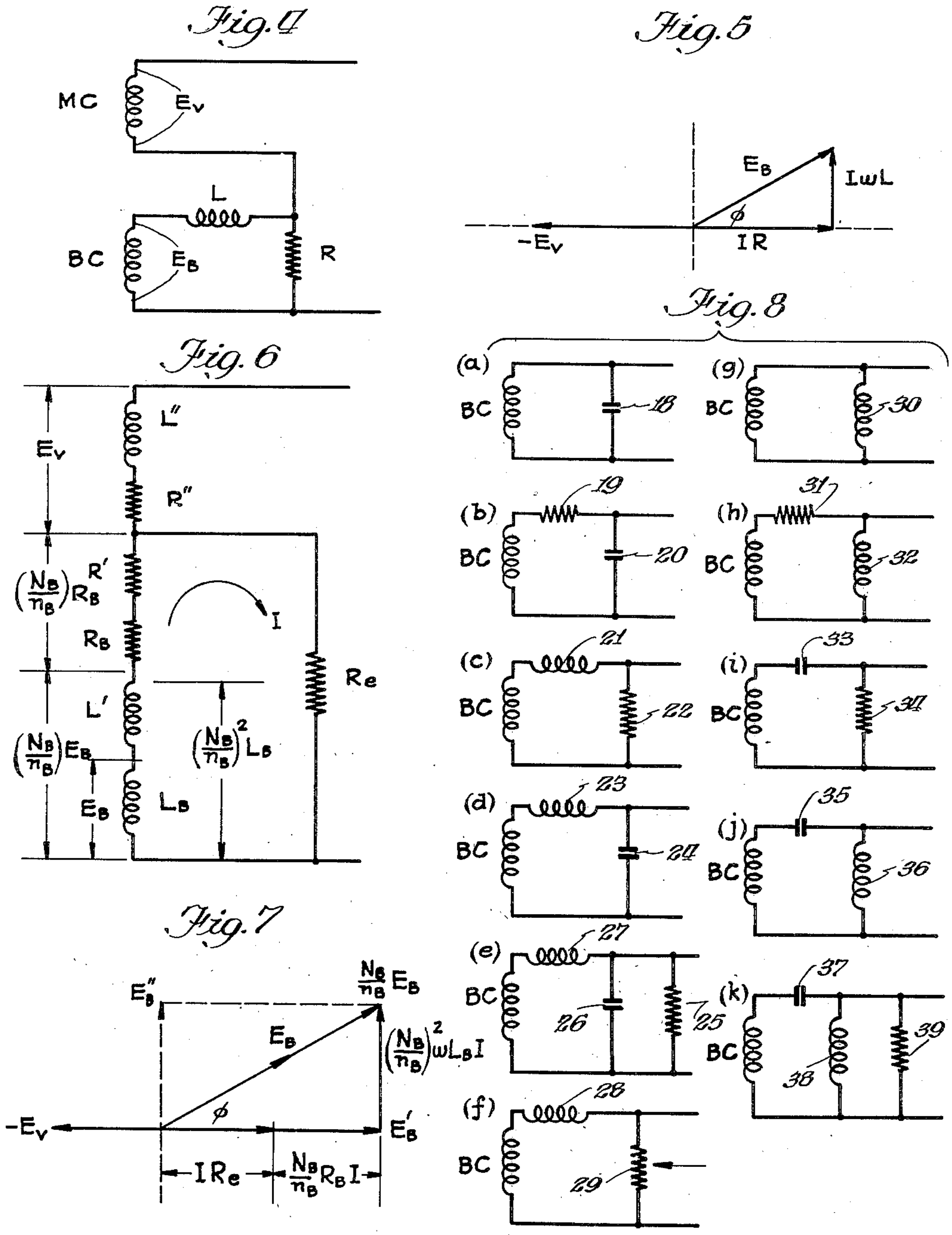
Figure 4 shows an open circuit embodying the invention.
Figure 5 is a vector diagram corresponding to the circuit of Figure 4.
Figure 6 shows the circuit of Figure 4 in detail.
Figure 7 is a vector diagram corresponding to the circuit of Figure 6.

The invention in a preferred embodiment uses the basic circuit shown in Figure 4 in order to derive a hum voltage from the hum bucking coil which is opposite in phase to that of the moving coil, Figure 5 being the corresponding vector diagram of Figure 4. In Figure 4, BC indicates the bucking coil. To obtain a voltage from $E_B$ which will lag $E_B$ by $\phi$ and be in phase with $E_V$ add an inductance L and a resistor R as follows: The additional inductance is connected in series with the bucking coil BC, and the resistor R is connected in parallel with the combination of the inductance and the bucking coil. Using the terminals of the resistor R, the moving coil MC is connected in series with the closed circuit consisting of the coil BC, the inductance L and the resistor R. In the coil BC is the voltage $E_B$ induced by the alternating hum current in the field coil, and induced in the moving coil MC is the voltage $E_V$. For the purpose of illustration in Figures 4 and 5, the inductance and resistance of the bucking coil BC are lumped in with the inductance L and resistance R which are considered as the lumped values L and R in the closed circuit. Figure 5 illustrates how a voltage IR may be obtained from the resistance component which will be in phase with the voltage Ev. In addition to being of the same phase it is also necessary that the two voltages be of equal magnitude; however, the total IR component is not available for connection thereto, as a part of the resistance is inherent within the bucking coil. Therefore, in order to increase the value of the available IR drop and yet maintain the required ratio of L to R, it is necessary to increase the bucking coil voltage $E_B$ so that it is still greater than the voltage Ev. This is accomplished by increasing the number of turns in the bucking coil BC.

According to the present invention it is possible in a dynamic loudspeaker having a bucking coil to calculate with a fair degree of accuracy the value of the required resistor and the number of turns to be added to the bucking coil in order to obtain the desired result, and even provide the required additional inductance within the bucking coil itself, thus eliminating the need of an inductance separate from that of the bucking coil.

To do this it is first required that the following data be known (the symbols refer to Figures 6 and 7);

1. Number of turns of the bucking coil of a dynamic loudspeaker not embodying the present invention ($n_B$).
2. Resistance value of said bucking coil ($R_B$).
3. Inductance value of said bucking coil ($L_B$).
4. Hum voltage induced across said bucking coil ($E_B$).
5. Hum voltage induced across the moving coil of the loudspeaker (Ev).
6. Net voltage when said bucking coil and said moving coil voltages are connected in series opposition.

All this data can be easily obtained by the usual well-known measuring methods.

From physics is known that the voltage and resistance vary directly as the number of turns in the bucking coil. The inductance of the bucking coil varies as the square of the number of turns. Although this is not exactly true, as other factors are also involved, nevertheless, the resulting error in the following computation is so small that it can be neglected.

Figure 6, which is the circuit of Figure 4 in detail, shows the bucking coil BC divided into an inductance portion $L_B$ and a resistance portion $R_B$. When additional turns are added to the bucking coil BC, this introduces in the circuit additional inductance L′ and additional resistance R′. The induced voltage $E_B$ is raised by introducing inductance L′ to $\{N_B/n_B\}.E_B$; $n_B$ being the number of bucking coil turns originally, that is to say, before introduction of L′, whilst $N_B$ expresses the number of bucking coil turns after introduction of L′. The total value of the inductance in the hum bucking circuit is therefore $\{N_B/n_B\}^2.L_B$, whilst the value of the original resistance and additional resistance in the circuit is $\{N_B/n_B\}.R_B$. The total value of the resistance in the circuit is $\{N_B/n_B\}.R_B+R_e$ ($R_e$ being the value of the load resistor).

The current flowing in the closed circuit is represented by I.

The moving coil MC consists likewise of an inductance portion L″ and a resistor portion R″. The induced voltage being Ev.

Figure 7 shows the vector diagram corresponding to the circuit of Figure 6. The voltage on resistor $R_e$ being $IR_e$, whilst the voltage on the resistor $R_B$ and R′ together is $\{N_B/n_B\}.R_B.I$.

In vector $E'_B=IR_e+\{N_B/n_B\}.R_B.I$, $IR_e$ must equal Ev, $\{N_B/n_B\}^2.\omega L_B.I$ being the total voltage on the inductance $L_B$ and L′ together, and in which $\omega=2\pi f$ ($f$ being the frequency of the alternating current causing hum).

$$E''_B=\{N_B/n_B\}^2.\omega L_B.I$$

Vector $(N_B/n_B).E_B$ is the total voltage induced in the bucking coil after correction of the bucking coil. $E_B$ represents the magnitude of this vector before correcting the voltage of the bucking coil by increasing its number of turns. Calculation to find an expression for $N_B/n_B$ and for $R_e$, if Ev, $E_B$, $\omega$, $R_B$, $\phi$, $L_B$ are known data: Consider Figure 7:

$$\{E'_B\}^2+\{E''_B\}^2=[\{N_B/n_B\}.E_B]^2$$

$$I^2.\{R_e+N_B/n_B.R_B\}^2+I^2.[\{N_B/n_B\}^4.\{\omega L_B\}^2]=[\{N_B/n_B\}.E_B]^2$$

$$I=\frac{N_B/n_B\cdot E_B}{\sqrt{\{R_e+N_B/n_B\cdot R_B\}^2+\{N_B/n_B\}^4\cdot\{\omega L_B\}^2}}$$

but $IR_e=Ev$ or $I=E_v/R_e$.

Therefore, $$E_v=\frac{N_B/n_B\cdot E_B\cdot R_e}{\sqrt{\{N_B/n_B\cdot R_B+R_e\}^2+[\{N_B/n_B\}^2\cdot\omega L_B]^2}}\qquad(1)$$

but $$\sqrt{\{N_B/n_B\cdot R_B+Re\}^2+[\{N_B/n_B\}^2\cdot\omega L_B]^2}=\frac{\{N_B/n_B\}\cdot R_B+Re}{\cos\phi}\qquad(2)$$

substitute (2) into (1)

$$E_v=\frac{\{N_B/n_B\}\cdot E_B\cdot R_e\cos\phi}{\{N_B/n_B\}\cdot R_B+R_e}\qquad(3)$$

Solve for $N_B/n_B$ $$N_B/n_B=\frac{\left\{\frac{E_v}{E_B}\right\}\cdot R_e}{R_e\cos\phi-\left\{\frac{E_v}{E_B}\right\}R_B}\qquad(4)$$

$$\tan\phi=\frac{\{N_B/n_B\}^2\omega L_B}{\{N_B/n_B\}R_B+R_e}\qquad(5)$$

Substitute (4) into (5) and solve for $R_e$ $$R_e=\frac{\left\{\frac{E_v}{E_B}\right\}^2\cdot\omega L_B}{\cos\phi\sin\phi}+\frac{E_v}{E_B}\left\{\frac{R_B}{\cos\phi}\right\}\qquad(6)$$

This gives $R_e$ in terms of known values. After solving for $R_e$ then $N_B/n_B$ is determined from (4) and $$\frac{N_B}{n_B}=\frac{\left\{\frac{E_v}{E_B}\right\}\cdot R_e}{R_e\cos\phi-\left\{\frac{E_v}{E_B}\right\}\cdot R_B}$$

The following is an actual example:

$Ev=.0433$ volt
$E_B=.043$ volt
$n_B=48$ turns
$R_B=.622$ ohm
$L_B=.000263$ H(enry)
$\phi=6°30'$
$R_e=2.41$ computed, 2.4 experimental
$N_B/n_B=1.37$ computed, 1.31 experimental ($N_B=63$ turns)

Before correction the net voltage of the moving coil and bucking coil was .0049 volt. After correction this dropped to .0005 volt which represents an improvement of about 20 decibels as the hum current is reduced by about this same factor.

Figures 8*a* to 8*k* show a plurality of possible hum bucking circuits embodying the invention. In applications other than dynamic loudspeakers it may be preferable to use one of these circuit arrangements, as may be dictated by such considerations as the sign and magnitude of the phase difference, the impedance of the device, space limitations, and ease of adjustment.

Figures 8*a* to 8*f* inclusive show bucking coil phase correcting circuits for a moving coil voltage $E_V$ lagging bucking coil voltage $E_B$, whereas the circuits shown in Figures 8*g* to 8*k* inclusive show circuit for a moving coil voltage $E_V$ leading bucking coil voltage $E_B$.

Figure 8*a* shows a capacitor 18 parallel with the bucking coil BC. Figure 8*b* shows a resistor 19 in series with a capacitor 20 parallel with the bucking coil BC. Figure 8*c* shows an inductance 21 in series with the resistor 22 parallel to the bucking coil. Figure 8*d* shows an inductance 23 in series with a capacitor 24 parallel with the bucking coil BC. Figure 8*e* shows a resistor 25 and a capacitor 26 in parallel, and in series therewith is an inductance 27, the whole combination being parallel with the bucking coil. Figure 8*f* shows an inductance 28 in series with a variable resistor (potentiometer) 29 parallel with the bucking coil BC. Figure 8*g* shows an inductance 30 parallel with the bucking coil BC. Figure 8*h* shows resistor 31 in series with an inductance 32, the combination being parallel to the bucking coil BC. Figure 8*i* shows a capacitor 33 in series with a resistor 34, the combination being parallel to the bucking coil BC. Figure 8*j* shows a capacitor 35 in series with an inductance 36, the combination being parallel to the bucking coil BC. Figure 8*k* shows an inductance 38 and a resistor 39 in parallel, and in series therewith a capacitor 37, the whole combination being parallel with the bucking coil BC. In the circuits 8*c*, 8*e*, 8*i* and 8*k* it is possible to use instead of non-variable resistors, variable resistors (potentiometers).

Figure 9 illustrates a shorted turn tester of well known construction in which PC1 and PC2 are pickup coils, usually being identical, and connected in opposition.

The coils PC1 and PC2 are located on a magnetic core M. The magnetic core M has on one side an extension E to provide space for a test coil TC to be tested on shorted turns. Located substantially in the middle between the pickup coils PC1 and PC2 is a field coil FC. Through the field coil FC flows an alternative current from a source supplying alternative current preferably having a frequency of 1000 cycles. Voltages induced in the coils PC1 and PC2 by the flux of the field coil are led to the inputside of an amplifier A. Due to connection in series opposition of the coils PC1 and PC2 zero signal output is obtained at the outputside of the amplifier. Therefore, an indicator I connection to the outputside of the amplifier indicates no bias. The degree of balance between coils PC1 and PC2 determines the sensitivity. However, in common practice a perfect balance cannot be obtained because of a phase difference between the voltages induced in the coils PC1 and PC2 which is due to the unsymmetrical magnetic circuit.

The use of a phase correcting circuit in accordance with the present invention is shown in Fig. 10 connected to coil PC2. This circuit will correct the phase difference and will permit the use of a magnetic circuit best adapted to the physical application of the apparatus.

The phase correcting circuit includes an additional inductance element L and a resistor element R.

The shown circuits are not all of the possible circuit arrangements. It is therefore to be understood that the invention is not limited to the circuits shown and described, as it is obvious that various other arrangements may be provided which fall within the spirit and scope of the invention, and within the ambit of the appended claims.

We claim:

1. In an electro-mechanical transducing apparatus having a coil; means for suppressing hum in said coil comprising a closed circuit including a bucking coil and a reactance element, said circuit comprising a phase shifting impedance connected to said coil so that the voltage in said hum bucking circuit is in opposition to the voltage in said coil.

2. In an electro-mechanical transducing apparatus having a coil; means for suppressing hum in said coil comprising a closed circuit including a bucking coil and reactance elements, said circuit comprising a phase shifting impedance connected to said coil so that the voltage in said hum bucking circuit is in opposition to the voltage in said coil.

3. Electro-mechanical transducing apparatus according to claim 2, wherein one of said reactance elements is a variable resistor.

4. In an electro-mechanical transducing apparatus having a coil and a hum bucking coil; means comprising a hum bucking impedance circuit for shifting the phase of the hum voltage induced in said hum bucking coil to a degree sufficient to suppress the hum voltage in said coil when said coil is connected in series to said circuit.

5. In electro-mechanical transducing apparatus having a coil and a hum bucking coil; means for eliminating hum after hum voltage has been induced in said coil, comprising a closed hum bucking circuit, reactance elements in said circuit having an impedance for shifting the phase of the hum voltage induced in said hum bucking coil to a degree sufficient to suppress the hum voltage in said coil when said coil is connected in series with said circuit.

6. In electro-mechanical transducing apparatus having a voice coil having a hum voltage and a hum bucking coil for generating a hum bucking voltage equal to the hum voltage in the voice coil; means for eliminating hum after hum voltage has been induced in said coil, comprising a hum bucking circuit, fixed reactance elements in said circuit, said reactance elements being an additional inductance element in series with said bucking coil and a fixed load resistor element parallel with said bucking coil and said additional inductance element for shifting the phase of the hum voltage induced in said hum bucking coil, whereby to suppress the hum voltage in said coil when said coil is connected in series to said circuit.

7. An electro-mechanical transducing apparatus as claimed in claim 6, wherein said reactance elements have a predetermined value.

8. In an electro-mechanical transducing apparatus having a voice coil having a hum voltage, and a hum bucking coil for generating a hum bucking voltage equal to the hum voltage in the voice coil; means for eliminating hum after hum voltage has been induced in said coil, comprising a circuit, fixed reactance elements in said circuit, said reactance elements comprising an inductance element in series with said bucking coil and forming with said bucking coil, a hum bucking coil having additional turns, and a fixed resistor element parallel with said hum bucking coil having additional turns for shifting the phase of the hum voltage induced in said hum bucking coil, whereby to suppress the hum voltage in said coil when said coil is connected in series to said circuit.

9. In an electro-magnetic transducing apparatus having a first coil, a field coil and a second coil; a closed circuit, including said second coil having an impedance for shifting the phase of the voltage induced in said second coil by said field coil to a degree sufficient to equalize the voltages induced in said first mentioned and said second coil.

10. In an electro-magnetic transducing apparatus having a first coil, a field coil and a second coil; a closed circuit and reactance elements in said circuit, said reactance elements constituting an additional inductance element in series with said second coil and a load resistor element parallel with said second coil and said inductance element having an impedance for shifting the phase of the voltage induced in said second coil by said field coil to a degree sufficient to equalize the voltages induced in said first mentioned coil and said second coil.

11. An electro-magnetic transducing apparatus as described in claim 10, wherein said load resistor element is variable.

ROBERT H. DREISBACH.
CLIFFORD L. HARDWICK.

REFERENCES CITED

The following references are of record in the file of this patent:

UNITED STATES PATENTS

| Number | Name | Date |
|---|---|---|
| 1,105,924 | Pridham et al. | Aug. 4, 1914 |
| 1,535,538 | Maxfield et al. | Apr. 28, 1925 |
| 1,830,401 | Meissner | Nov. 3, 1931 |
| 1,830,402 | Meissner | Nov. 3, 1931 |
| 2,190,318 | Kellogg | Feb. 13, 1940 |

FOREIGN PATENTS

| Number | Country | Date |
|---|---|---|
| 272,622 | Great Britain | June 20, 1927 |
| 456,027 | Great Britain | Nov. 2, 1936 |